Figure 1:
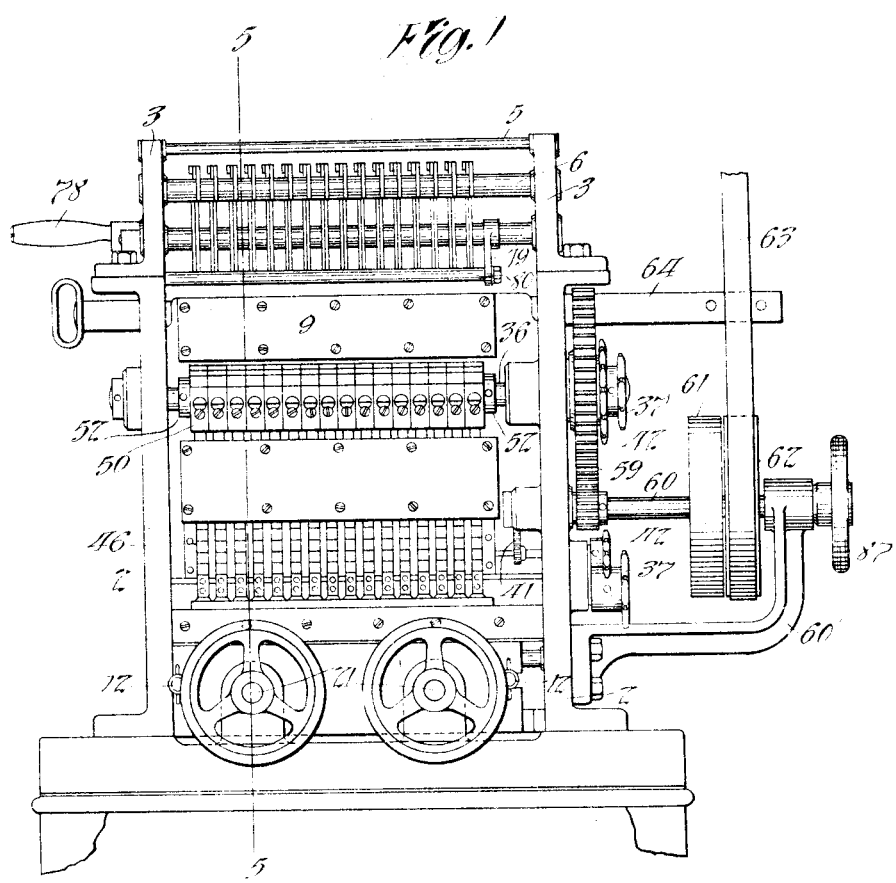

T. A. EDISON.
RECEPTACLE FILLING MACHINE.
APPLICATION FILED JUNE 7, 1912.

1,178,063.

Patented Apr. 4, 1916.
6 SHEETS—SHEET 1.

Witnesses:
C. E. Brown

Inventor:
Thomas A. Edison
by Frank L. Dyer
Atty.

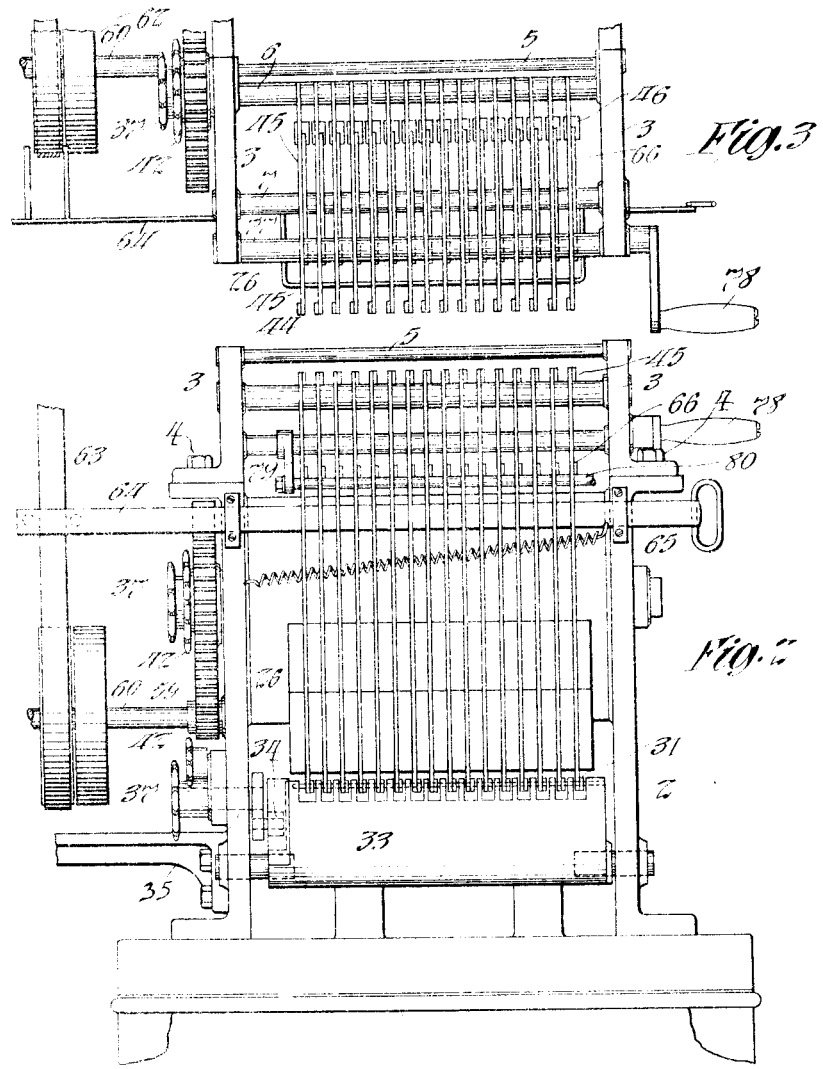

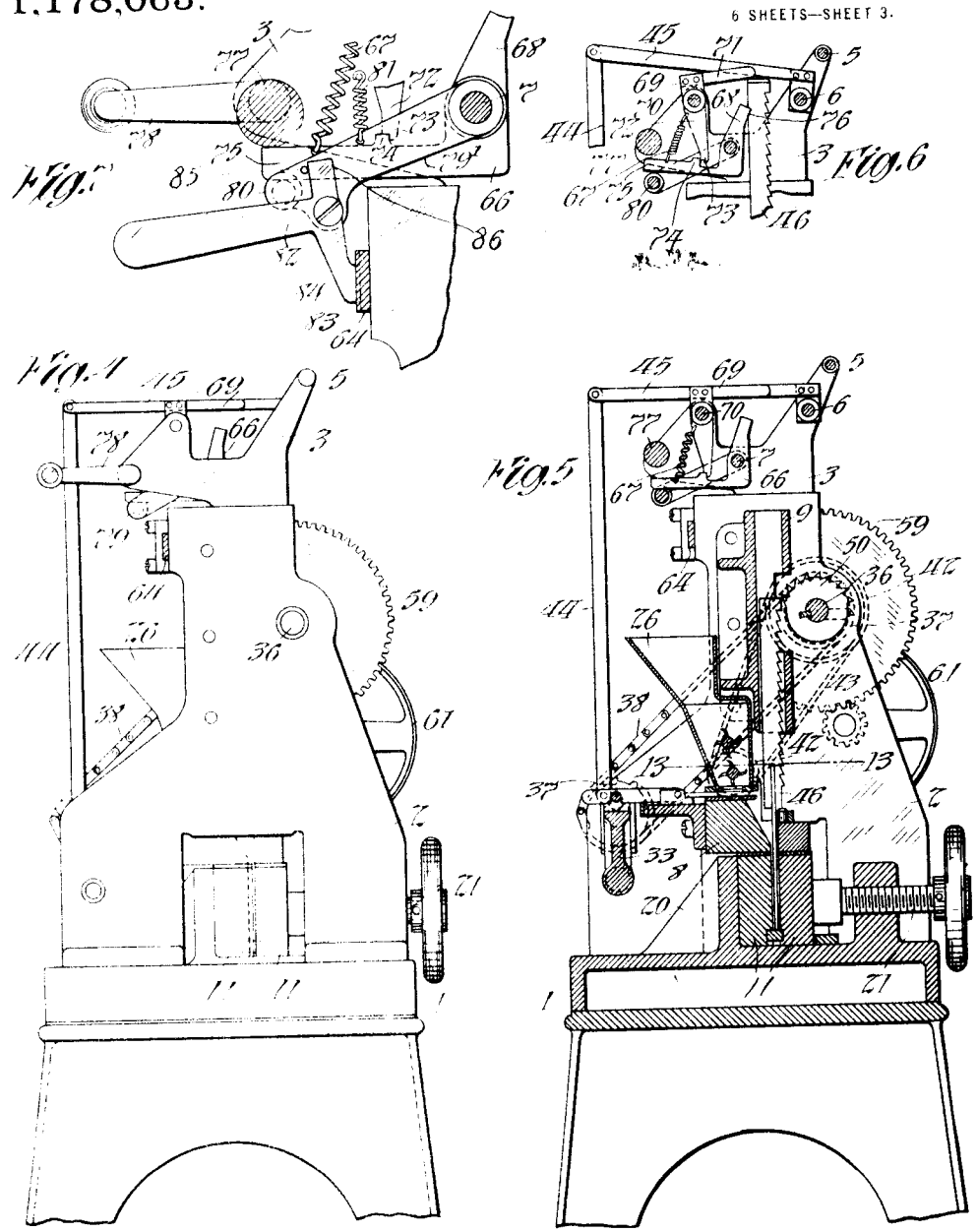

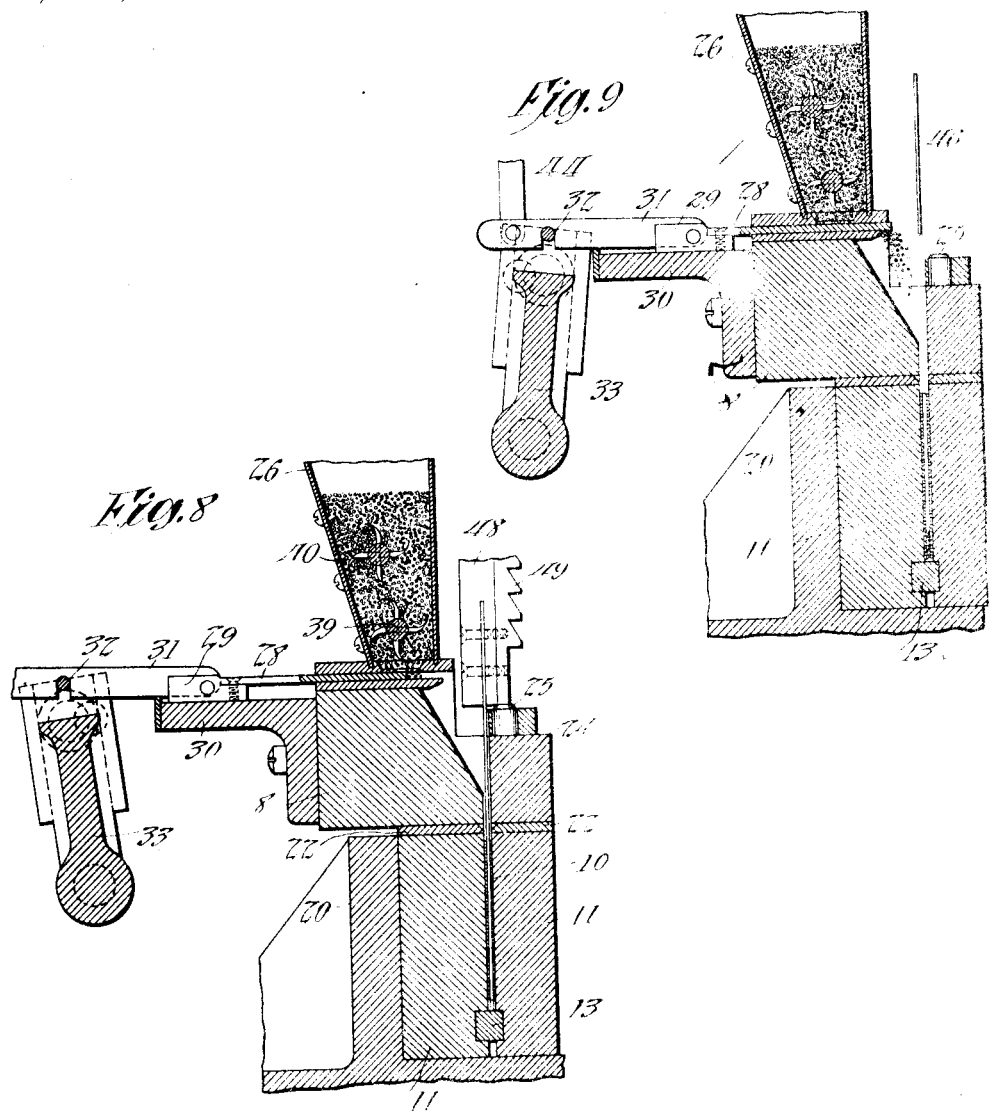

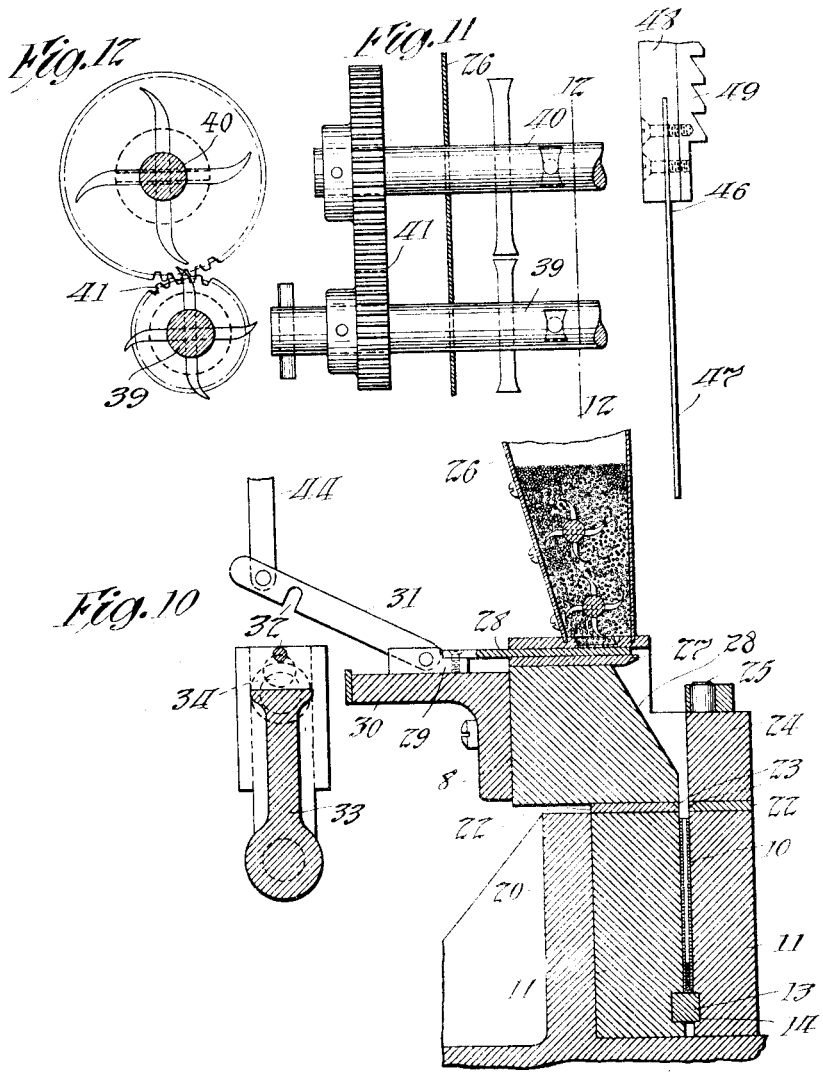

T. A. EDISON.
RECEPTACLE FILLING MACHINE.
APPLICATION FILED JUNE 7, 1912.
1,178,063.
Patented Apr. 4, 1916.
6 SHEETS—SHEET 6.
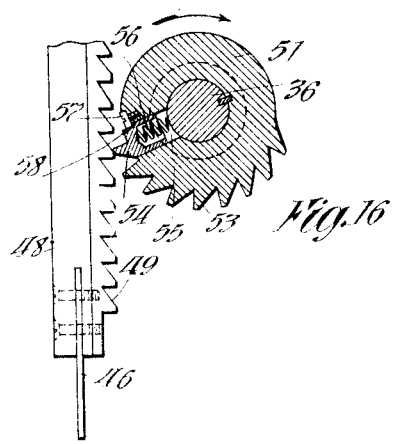
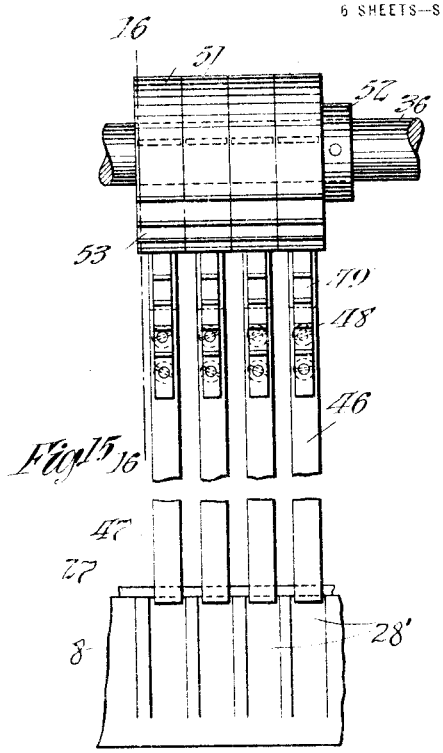
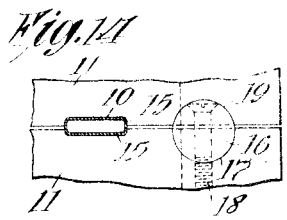
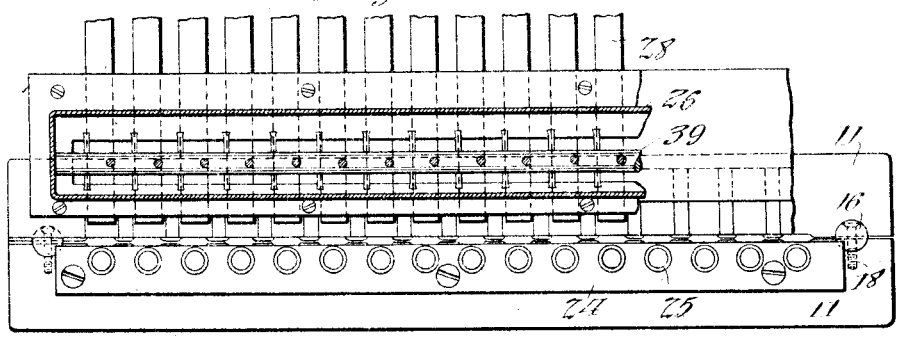
Witnesses:
Inventor:
Thomas A. Edison
by Frank L. Dyer
Atty.

UNITED STATES PATENT OFFICE.

THOMAS A. EDISON, OF LLEWELLYN PARK, WEST ORANGE, NEW JERSEY, ASSIGNOR TO EDISON STORAGE BATTERY COMPANY, OF WEST ORANGE, NEW JERSEY, A CORPORATION OF NEW JERSEY.

RECEPTACLE-FILLING MACHINE.

1,178,063.   Specification of Letters Patent.   Patented Apr. 4, 1916.

Application filed June 7, 1912. Serial No. 702,168.

*To all whom it may concern:*

Be it known that I, THOMAS A. EDISON, a citizen of the United States, and a resident of Llewellyn Park, West Orange, in the county of Essex and State of New Jersey, have invented certain new and useful Improvements in Receptacle-Filling Machines, of which the following is a description.

In my improved alkaline storage battery, the negative electrodes consist of plates or grids of nickel plated steel having rectangular openings therein, in which are held flat perforated pockets of nickel plated sheet steel containing compressed therein active material consisting principally or entirely of electrolytically active iron or iron oxid.

My invention relates generally to machines for filling receptacles and is designed particularly for filling and compressing active material into pockets for use in my improved battery, the material being fed into open ends of the pockets. My invention may also be embodied in apparatus for filling tubes or receptacles of other forms, and in some respects is an improvement in the apparatus described in my prior Patent No. 936,433, dated October 12, 1909.

The principal object of my invention is to provide an improved machine of this type by which small increments of active material will be intermittently supplied to a number of flat pockets; a uniform pressure will be applied to each increment so fed; the feeding and pressure operations for the respective pockets will be independently arrested when the material in the corresponding pockets reaches a predetermined level; and in which provision is made for automatically arresting the operation of the machine when all the pockets have been filled to the predetermined level, whereby all the pockets will be substantially uniform as to the weight of active material carried, and as to the density and molecular condition of such active material so that the resulting electrode elements may all be of a standard size and capacity.

Another object of my invention is to provide an improved apparatus, the use of which will greatly expedite and cheapen the operation of filling the pockets for storage battery electrodes.

Other objects of my invention reside in the details of construction and combinations of elements hereinafter more particularly set forth.

In order that my invention may be more clearly understood, attention is hereby directed to the accompanying drawing forming a part of this specification, in which the same reference characters are used to designate corresponding parts throughout and in which—

Figure 1 is a front elevation of an apparatus constructed in accordance with my invention; Fig. 2 is a rear elevation thereof; Fig. 3 is a top plan view of the apparatus, partly broken away; Fig. 4 is a side elevation of the apparatus; Fig. 5 is a sectional view, on line 5—5 of Fig. 1, showing the feeding devices and tamping pressure applying means in operative position with respect to the operating means; Fig. 6 is a detailed view of the upper portion of Fig. 5 showing the manner in which the locking means for the plungers and the means for effecting disconnection of the feeding devices and operating means are controlled by the plungers; Fig. 7 is an enlarged detail view, partly in section, showing the means for locking the belt shifter, the manner in which the plunger locking means controls the belt shifter locking means, and the resetting device for the plunger locking means; Figs. 8, 9 and 10 are enlarged sectional views of a part of the machine and corresponding to the lower portion of Fig. 5, which views illustrate three different relative positions of the feeding device, and gravity plunger coöperating with one of the receptacles to be filled; Fig. 11 is a view, partly broken away, of the agitators for the feed hopper, and the means for operating the same, a portion of the feed hopper being shown in section; Fig. 12 is a section on line 12—12 of Fig. 11, the feed hopper being omitted; Fig. 13 is a fragmentary sectional view on line 13—13 of Fig. 5, parts being omitted, showing the relative arrangement of the feeding fingers and the receptacle support; Fig. 14 is a fragmentary plan view of the receptacle supporting means showing one of the receptacles held therein; Fig. 15 is a detail view, showing a number of the gravity plungers for applying pressure to the material in the receptacles, a portion of the operating means therefor, and a portion of the guide for guiding the plungers and material into the receptacles; and Fig. 16 is a section on line 16—16 of Fig. 15.

Referring to the drawings, the frame of the machine comprises a base 1, a pair of side pieces or standards 2, 2, having brackets 3, 3 suitably secured to their upper ends, as by bolts 4, 4, tie rods 5, 6, and 7 connecting brackets 3, 3, and a support 8 and hollow guide 9 secured between side pieces 2—2 intermediate the top and bottom thereof. The pockets 10 to be filled are preferably each formed of two cup sections of different depths and one end of the pocket is left open. The material from which the pockets are formed is preferably thin sheet steel, which has been perforated and carefully nickel plated, as explained in my prior Patent No. 700,137, dated May 13, 1902. After the pockets 10 have been filled with the active material the ends are closed, the pockets are then placed in the apertures of a storage battery grid, crimped in place, and corrugated as described in my prior Patent No. 704,305, dated July 8, 1902. A number of the empty pockets 10, with one end open, are held tightly between the clamping members 11, 11, which may be locked together as by bolts 12, 12. The pockets are adapted to rest on a guide piece 13 fitting in grooves 14 in members 11, 11, and are also adapted to fit in the registering grooves or recesses 15 in the members 11, 11. In order to properly position and space members 11, 11, I provide one of these members with suitable projections adapted to register with recesses in the other member. These projections are preferably provided by suitably securing dowel pins 16 in a pair of recesses 17 of one of the clamping members 11, as by screws 18, the projecting portions of the dowel pins being adapted to register with recesses 19 of the other clamping member. The corresponding recesses 17 and 19 and dowel pins 16 are preferably formed with engaging surfaces having the same radii of curvature, but the aggregate depth of a pair of registering recesses 17 and 19 is somewhat less than the diameter of the corresponding dowel pin whereby when the clamping members are fastened together they will be slightly spaced. The clamping members 11, 11, having been properly assembled with the pockets in position therebetween, are now placed on the machine and held in proper position thereon against support 20 by means of screws 21. On the top of the members 11, 11 are secured plates 22, 22, which are provided with registering beveled recesses 23 forming guiding apertures for the material to be fed to the pockets 10, as well as for the plungers which are lowered into and raised out of said pockets. One of the members 11 is also provided with suitable supporting means 24 for a plurality of independently removable shock blocks 25, preferably of hardened steel, for limiting the movement of the plungers into the pockets.

Secured between the standards 2, 2 is a hopper 26 for containing the active material to be fed to the pockets, the bottom of the hopper being provided with openings corresponding in number to the pockets to be filled.

The bottom of the hopper and a member 27 secured to the support 8 form guiding means for a series of feeding fingers 28 adapted to be reciprocated beneath the hopper to feed successive increments of material from the hopper to the respective pockets. Suitable channels 28' are provided in that face of member 8 which opposes the supporting means 24 for guiding the material and the plungers into and out of the pockets. Each of the fingers 28 is suitably connected to a member 29 sliding on a bracket 30, which is mounted on support 8. To each of the members 29 is pivoted a link 31 which has a slot and pin connection 32 with an oscillating crank 33 forming a part of the operating means. The crank 33 is adapted to be oscillated so as to cause reciprocation of the fingers 28, and connecting means 31 and 29, by means of an eccentric 34, the eccentric being connected to a shaft 35 suitably driven from an operating shaft 36, as by means of sprockets 37 and chain 38. In order to keep the material in hopper 26 in a loose condition to allow the same to feed freely through the openings in the bottom thereof, I provide in the lower portion of the hopper, a pair of agitator shafts 39 and 40, preferably having blades secured thereto above each opening in the bottom of the hopper, one of which shafts is adapted to be driven from the other shaft as by gearing 41, the driving agitator shaft being in turn driven in any suitable manner, as by sprockets 42 and chain 43, from the operating shaft 36. Each of the links 31 is pivotally connected, at its outer end, to a vertical link 44, which latter link is pivotally connected at its upper end to one end of a lever 45, the lever 45 being pivotally mounted at its opposite end on the tie rod 6. The weight of the parts 45, 44, and 31 tends to maintain links 31 in operative connection with crank 33, but it will be obvious that on swinging one of the levers 45 upwardly about the tie rod 6 the corresponding link 31 will be disconnected from the crank 33 as shown in Fig. 10.

The gravity plungers 46, one for each pocket 10, are movable vertically in the hollow guide 9 and are suitably operated so as to give a substantially uniform tamping pressure on each increment of material fed to the pockets irrespective of the amount of material at any time within the pockets. This result is accomplished by the following construction: Each plunger is formed with a lower tamping portion 47, adapted to enter the corresponding pocket 10, and to the upper end of the tamping portion is suitably attached a weighted portion 48, loosely fitting in the guide 9 and provided with a ratchet toothed rack 49. The rack 49 is adapted to be engaged by the teeth formed on a drum 50 carried by the operating shaft 36; an opening being provided in the guide 9 through which a portion of the drum projects as shown in Fig. 5. The drum 50 is preferably formed by a plurality of disks 51 corresponding in number to the plungers 46, the disks being keyed to shaft 36 and suitably secured against longitudinal movement thereon as by collars 52 and each disk is provided with the same number of ratchet teeth 53 on a portion only of its periphery. The disks are so secured to the shaft 36 that the toothed portions thereof will occupy the same relative angular positions with respect to the shaft. The racks 49 are sufficiently extended so as to be engageable by the teeth on the respective disks 51 at any position which may be occupied by the plungers within the pockets to be filled, so that each plunger will be elevated for a distance substantially corresponding to the number of teeth on the respective disk 51 and be allowed to drop when the teeth separate, always from substantially the same height above the material within the pocket so as to apply to the same a substantially constant tamping pressure. The teeth which form each rack 49 are so located that when the corresponding plunger 46 is in its lowest position the upper part of the rack will be in position to be engaged by the teeth on the respective disk 51, and as the plunger 46 in performing its tamping operations occupies positions which are more and more elevated, the teeth of the disk 51 will eventually engage the teeth which form the lower part of the rack 49, the number of the rack teeth being considerably greater than the number of teeth on the corresponding disk 51. It will be apparent that in the operation of elevating the plungers from any position of rest, considerable concussion is produced by the initial engagement of the first tooth of a disk 51 and a tooth on the corresponding rack, and should this engagement take place at or near the ends of the teeth, the teeth would be liable to be broken. In order to overcome this objection, the first engaging tooth 54 of each disk 51 has a slightly rounded end and is resiliently mounted in a slot 55 in the disk by means of a spring 56, as clearly shown in Fig. 16. Each disk is provided with a screw 57, the head of which coöperates with a shoulder 58, formed on tooth 54 to limit its outward movement. The remaining teeth of the disks 51 may conveniently be formed integral therewith. Therefore, should the end of tooth 54 engage with the end of one of the rack teeth, the tooth 54 would be pressed inwardly against spring 56, and slide over the rack tooth to engage the next rack tooth as will be evident. The operating shaft 36 is suitably driven, as by gearing 59, from the main shaft 60. On the main shaft 60, supported in bearings on one of the standards 2 and a bracket 60' secured to the standard, are mounted a fixed pulley 61 and a loose pulley 62 adapted to be driven by a belt 63. The position of the belt 63 is controlled by a belt shifter 64 slidingly mounted on the frame of the machine, and a spring 65 tends to maintain the belt shifter and thereby the belt 63 in a position in which the belt engages the loose pulley 62. The operating means is preferably designed so that increments of material will be fed to the pockets only as the plungers are being elevated and the openings in the hopper 26 will be closed by the feeding fingers 28 at all other times. Preferably the arrangement is such that each increment of material fed to any pocket is subjected to but a single tamping pressure before the feeding of the next increment thereto, but obviously this arrangement may be varied so as to apply two or more tamping pressures to each successive increment, if desired.

Owing to variances in the increments of material fed to the pockets and to slight variances in the tamping pressures applied by plungers 46, due to an occasional slipping of a first engaging tooth 54 over a rack tooth, the rate of filling the pockets is not exactly uniform, and the material in some pockets reaches the desired level before it does in others. It is therefore desirable to provide for independently disconnecting the respective feeding means and operating means and for independently holding the respective plungers in inoperative position with relation to the operating means upon the disconnection of the corresponding feeding means. Pivotally mounted on the tie rod 7 is a plurality of locking members 66, preferably bell crank levers, adapted respectively to coöperate with plungers 46, to lock the same in inoperative position with respect to disks 51 when the material in the corresponding receptacles has reached a predetermined level, and the plungers are raised to the highest elevation above that level. Springs 67 constantly tend to force the arms 68 of locking members 66 into the path of the plungers, but I provide a plurality of latches 69, also preferably formed as bell crank levers, which are adapted respectively to hold the locking members 66 in inoperative position until the respective receptacles 10 have been filled to the desired level. The latches 69 are pivoted on a rod 70 mounted in the brackets 3—3, and one arm 71 of each latch lies in the path of the corresponding plunger 46, as does also the link 45 for controlling the corresponding feeding devices.

The arms 72 of latches 69 are provided with detents 73 adapted to coöperate with projections 74 formed on arms 75 of locking members 66, to hold the latter in inoperative position. Each of the plungers 46 is provided with a notch 76 adapted to be engaged by the end of arm 68 of the corresponding locking member 66. A rod 77 is eccentrically mounted in brackets 3—3, and is adapted to be operated by a crank 78 to engage arms 75 of locking members 66 to force the latter into inoperative position and allow the detents 73 of latches 69 to engage projections 74 to hold the locking members in such position as clearly shown in Fig. 7. Levers 79 and 79' are pivoted at one end on the tie rod 7 near the ends thereof, the other ends of the levers being rigidly connected by an alining rod 80 adapted to engage the lower surfaces of the arms 75 of the locking members 66. A spring 81 connected to one of the levers as 79', and to the frame of the machine tends to maintain this engagement. One of the levers, as 79', is provided with a member 82, pivotally mounted thereon, one end 83 of which is adapted to engage a slot 84 of the belt shifter 64 to lock the latter against the spring 65 in a position to engage the belt 63 with the fast pulley 61. A pin 85 on the lever 79', to which the member 82 is pivotally connected, coacts with a portion 86 of member 82 to limit the movement of the latter with respect to the lever in one direction.

Reference character 87 represents a hand brake wheel on the main shaft 60 for quickly stopping the machine when belt 63 is shifted to loose pulley 62.

The operation of the machine is as follows: Assuming the hopper 26 is filled with active material and the machine is at rest with plungers 46 locked in their elevated and inoperative position, and the feeding devices and operating means disconnected, the proper number of empty receptacles or pockets 10 is first fastened between clamping members 11 and the latter are then secured in place on the machine against support 20 by means of screws 21. Eccentric 77 is then turned by means of handle 78 and moves locking members 66 against the tension of springs 67 to disengage the same from the plungers 46 and the latter then fall into their respective receptacles. The latches 69 will now swing about rod 70 and the detents 73 will engage the projections 74 of locking members to hold the latter out of the path of the plungers and members 44, 44, and 31 will, under the action of gravity, cause members 33 and 31 to be operatively connected by the connection 32. At the same time the arms 75 of locking members 66 will swing the rod 80 and levers 79 and 79' against the tension of spring 81 and carry the member 82 into a position in which its end 83 contacts the belt shifter 64. The machine is now set into operation by grasping the handle of the belt shifter 64 and pulling the latter, against the tension of spring 65, to a position in which the belt 63 is held in engagement with the fast pulley 61. The end 83 of member 82 will now fall into slot 84 of the belt shifter to lock the latter in this position. The eccentric is now turned out of engagement with the locking members into the position shown in Fig. 6. Pulley 61 will now turn main shaft 60 and the latter will drive the operating shaft 36 through the gearing 59. The operating shaft by means of sprockets 37, chain 38, shaft 35, and eccentric 34 will oscillate the crank 33 and the latter by means of links 31 and members 29 will reciprocate the feeding fingers 28 to intermittently feed successive increments of material from the hopper 26 to the respective receptacles 10. The material in the hopper is kept in a loose condition by the operation of the agitator shafts 39 and 40 driven from the operating shaft by means of sprockets 42 and chain 43. The plungers 46 are at the same time intermittently raised and released by the teeth 53 of the disks 51, which are keyed to the operating shaft 36, engaging the rack teeth 49 of the plungers 46. The tamping pressures applied by the plungers are substantially uniform and the tamping and feeding operations take place alternately as set forth above. When the material in any receptacle 10 reaches a predetermined level the upper end of the corresponding plunger, when the latter is raised by its disk 51, will simultaneously engage the respective lever 45 and arm 71 of latch 69, and swing the same upwardly about the rods 6 and 70 respectively. The lever 45 will, by means of link 44, effect the disconnection of the operating means and the feeding device for this receptacle and the movement of the latch 69 about rod 70 will release the corresponding locking member 66 and its spring 67 will act to throw the arm 68 thereof into engagement with the notch 76 of the plunger to lock the latter in inoperative position with relation to the disk 51. As others of the receptacles become filled to the predetermined level, the respective feeding devices will be disconnected, and the respective plungers locked in inoperative position in a similar manner. Upon the filling of the last receptacle the last locking member 66 is released and the release thereof allows the spring 81 to swing members 79 and 79', 80 and 82 upwardly about rod 7 whereby the end 83 of the member 82 is disengaged from the slot 84 in the belt shifter 64. The spring 65 will now move the belt shifter 64 to slide the belt 63 from the fast pulley 61 to the loose pulley 62, whereupon the machine may be quicky brought to rest by the hand brake wheel 87. Clamping members 11 with the filled receptacles are now removed from the machine and replaced by other similar clamping members carrying empty receptacles and the above operation repeated.

Having now disclosed the nature of my invention, and specifically described one embodiment thereof, what I claim and desire to protect by Letters Patent, is—

1. In a receptacle filling machine, the combination of a receptacle support, means for intermittently feeding successive increments of material to the receptacle, a gravity plunger, means for elevating and then releasing said plunger for applying a tamping gravity pressure to the material in the receptacle between successive feeding operations, and means controlled by the plunger for simultaneously arresting the feeding and pressure operations, substantially as described.

2. In a receptacle filling machine, the combination of a receptacle support, means for intermittently feeding successive increments of material to the receptacle, a gravity plunger, means for elevating and then releasing said plunger for applying a tamping gravity pressure to the material in the receptacle between successive feeding operations, and means controlled by the plunger for arresting the feeding and pressure operations when the material in the receptacle reaches a predetermined level, substantially as described.

3. In a receptacle filling machine, the combination of a receptacle support, a gravity plunger coöperating with the receptacle, mechanism for elevating and releasing said plunger, and means controlled by the plunger for locking the plunger in inoperative position with respect to said mechanism when the material in the receptacle reaches a predetermined level, substantially as described.

4. In a receptacle filling machine, a gravity plunger, mechanism for elevating and releasing said plunger, and means controlled by the plunger for automatically locking the plunger in inoperative position with respect to said mechanism, substantially as described.

5. In a receptacle filling machine, the combination of a receptacle support, a feed hopper having an opening therein, means for intermittently and positively transferring successive increments of material from the hopper and feeding the same into the receptacle comprising a member reciprocating beneath said hopper and the opening therein, and means for arresting said reciprocating member in a position closing said opening when the material has reached a predetermined level in said receptacle, substantially as described.

6. In a receptacle filling machine, the combination of a receptacle support, a feed hopper having an opening therein, means for intermittently and positively transferring successive increments of material from the hopper and feeding the same into the receptacle comprising a member reciprocating beneath said hopper opening, means comprising a plunger for applying a tamping pressure to the material in the receptacle between successive feeding operations, and means controlled by said plunger for arresting said reciprocating member in a position closing said opening when the material has reached a predetermined level in said receptacle, substantially as described.

7. In a receptable filling machine, the combination of a receptacle support, means for feeding successive increments of material to the same, means comprising a plunger for applying tamping pressure to each increment fed into the receptacle, locking means for said plunger adapted to directly engage and hold the same inoperative, said locking means being normally biased to locking position, and means for holding the locking means in inoperative position, said plunger adapted to actuate said holding means to release said locking means, whereby the plunger will be held inoperative, when the material in the receptacle has reached a predetermined level, substantially as described.

8. In a receptacle filling machine, the combination of means for supporting a plurality of receptacles side by side in a vertical position, a series of gravity plungers respectively coöperating with said receptacles, mechanism for elevating and releasing said plungers, and separate means respectively controlled by the plungers, for automatically locking any plunger in inoperative position with respect to said mechanism when the material in the receptacle with which it coöperates attains a predetermined level, substantially as described.

9. In a receptacle filling machine, a series of gravity plungers, mechanism for elevating and releasing said plungers, and separate means respectively controlled by the plungers for automatically locking the respective plungers in inoperative position, substantially as described.

10. In a receptacle filling machine, the combination of means for supporting a plurality of receptacles side by side in a vertical position, separate devices for feeding successive increments of material to each of said receptacles, a single operating means for said feeding devices, and separate means for respectively disconnecting said feeding devices from said operating means when the material in the receptacles reaches a predetermined level, substantially as described.

11. A support for sustaining a plurality of receptacles in a receptacle filling machine, comprising two clamping members, a plurality of alining members rigidly connected with one of said clamping members and projecting therefrom, the other of said clamping members being provided with recesses to receive the projecting portions of said alining members, and means for locking the clamping members together, substantially as described.

12. A support for sustaining a plurality of receptacles in a receptacle filling machine, comprising two clamping members, each of said members being provided with a pair of similar part-cylindrical recesses which are opposed when the clamping members are locked together, dowel pins seated in the recesses of one clamping member and fixed to the latter, the dowel pins and corresponding recesses having the same radii of curvature, but the aggregate depth of each pair of the opposing recesses being somewhat less than the diameter of the corresponding dowel pin, and means for locking the clamping members together, substantially as described.

13. In a receptacle filling machine, the combination of means for supporting a plurality of receptacles side by side in a vertical position, and means comprising a series of gravity plungers for applying tamping pressure to material fed into the receptacles, each of said plungers being provided with a shoulder, and said supporting means being provided with a plurality of independently replaceable rigid shock members adapted to respectively coöperate with the shoulders on the plungers to definitely limit the extent of movement of the plungers into the receptacles, substantially as described.

14. In a receptacle filling machine, the combination of means for supporting a receptacle in a vertical position, and means comprising a gravity plunger for applying tamping pressure to material fed into the receptacle, said plunger being provided with a shoulder, and said supporting means being provided with a replaceable shock member adapted to coöperate with the shoulder of the plunger to limit the extent of movement of the plunger into the receptacle, substantially as described.

15. In a receptacle filling machine, the combination of means for supporting a plurality of receptacles side by side in a vertical position, separate means for feeding successive increments of material to each receptacle, a single operating means for the feeding means, and separate devices actuated by the operating means, and automatically operative to respectively disconnect the feeding means from the operating means when the material in the receptacles has reached a predetermined level, substantially as described.

16. In a receptacle filling machine, the combination of means for supporting a plurality of receptacles side by side in a vertical position, separate means for feeding successive increments of material to each receptacle, separate means for applying tamping pressure to each increment fed to each receptacle, operating means for the feeding and tamping means, said means including a single operating member for the feeding means, and separate means respectively controlled by the tamping means for respectively disconnecting the feeding means from the operating member when the material in the receptacles has reached a predetermined level, substantially as described.

17. In a receptacle filling machine, the combination of means for supporting a plurality of receptacles side by side in a vertical position, a feeding device for each receptacle for feeding successive increments of material thereto, a gravity plunger for each receptacle for applying tamping pressure to each increment fed thereto, means for operating the feeding devices and for elevating and releasing said gravity plungers, and a plurality of devices respectively controlled by the plungers to respectively disconnect the feeding devices from the operating means when the material in the receptacles reaches a predetermined level, substantially as described.

18. In a receptacle filling machine, the combination of means for supporting a plurality of receptacles side by side in a vertical position, a feed hopper having openings therein corresponding in number to the receptacles, a feeding device for each receptacle comprising a member reciprocating beneath the corresponding opening in the hopper, means for operating the feeding devices, and a plurality of devices respectively coöperating with the receptacles and feeding devices, and actuated by said operating means, for automatically disconnecting the feeding devices respectively from the operating means, with the reciprocating members respectively in positions closing the hopper openings, when the material in the respective receptacles reaches a predetermined level, substantially as described.

19. In a receptacle filling machine, the combination of means for supporting a plurality of receptacles side by side in a vertical position, a plurality of gravity plungers respectively coöperating with the receptacles, means for elevating and releasing said plungers, and a plurality of devices respectively controlled by the plungers for automatically locking the respective plungers out of operative relation with respect to said elevating and releasing means when the plungers are raised above a certain predetermined level, substantially as described.

20. In a receptacle filling machine, a plurality of gravity plungers, means for elevating and releasing said plungers, and a plurality of devices respectively controlled by the plungers for automatically locking the respective plungers in inoperative position with respect to said elevating and releasing means when the plungers are raised above a predetermined level, substantially as described.

21. In a receptacle filling machine, the combination of tamping means, operating means for the tamping means, and means controlled by the tamping means for automatically locking the tamping means in inoperative position with respect to said operating means, substantially as described.

22. In a receptacle filling machine, the combination of means for supporting a plurality of receptacles side by side in a vertical position, separate means for feeding successive increments of material to each receptacle, separate means for applying tamping pressure to each increment fed to each receptacle, operating means for the feeding and tamping means, separate means respectively controlled by the tamping means for disconnecting any of the feeding means from the operating means when the material in the corresponding receptacle has reached a predetermined level, and separate means also controlled by the tamping means for simultaneously locking the respective tamping means in inoperative position with respect to the operating means, substantially as described.

23. In a receptacle filling machine, the combination of means for supporting a plurality of receptacles side by side in a vertical position, a plurality of gravity plungers respectively coöperating with the receptacles, means for elevating and releasing said plungers, a plurality of spring pressed locking members normally tending to lie in the path of said plungers and adapted respectively to lock said plungers in inoperative position with respect to said operating means, and a plurality of latches respectively coöperating with said locking members to hold the same out of the path of the plungers, said plungers adapted respectively to actuate said latches to release said locking members when the plungers are raised above a predetermined level, substantially as described.

24. In a receptacle filling machine, the combination of means for supporting a plurality of receptacles side by side in a vertical position, a plurality of gravity plungers respectively coöperating with the receptacles, means for elevating and releasing said plungers, a plurality of spring pressed locking members normally tending to lie in the path of said plungers and adapted respectively to lock said plungers in inoperative position with respect to said operating means, a plurality of latches respectively coöperating with said locking members to hold the latter out of the path of the plungers, said plungers adapted respectively to actuate said latches to release said locking members when the plungers are raised above a predetermined level, and resetting means for simultaneously actuating said locking members to bring the same into operative engagement with said latches, and for releasing the plungers, substantially as described.

25. In a receptacle filling machine, the combination of means for supporting a plurality of receptacles side by side in a vertical position, a plurality of gravity plungers respectively coöperating with the receptacles, means for elevating and releasing said plungers, a plurality of spring pressed locking members normally tending to lie in the path of said plungers and adapted respectively to lock said plungers in inoperative position with respect to said operating means, a plurality of latches respectively coöperating with said locking members to hold the latter out of the path of the plungers, driving means for said operating means comprising a belt, a fixed and a loose pulley, spring pressed belt shifting means normally tending to hold the belt in engagement with the loose pulley and spring pressed means for holding the belt shifting means in a position in which the belt is held in engagement with the fixed pulley to drive the operating means, said last spring pressed means being held in operative engagement with the belt shifting means against the tension of its spring by the locking members when the latter are held out of the path of the plungers by said latches, said plungers adapted respectively to actuate said latches to release said locking members when the plungers are raised above a predetermined level, and the holding means for the belt shifting means being released when all said locking members have been released, substantially as described.

26. In a receptacle filling machine, the combination of means for supporting a plurality of receptacles side by side in a vertical position, a plurality of feeding devices for respectively feeding successive increments of material into the receptacles, a plurality of means for respectively applying tamping pressure to each increment fed to each receptacle, operating means for the feeding devices and tamping means, a plurality of means respectively actuated by the tamping means when the material in the corresponding receptacles reaches a predetermined level for disconnecting the operating means and corresponding feeding devices, and a plurality of means respectively controlled by the tamping means simultaneously with the actuation of the respective disconnecting means for the feeding devices for locking the respective tamping means in inoperative position with respect to said operating means, substantially as described.

27. In a receptacle filling machine, the combination of means for supporting a plurality of receptacles side by side in a vertical position, a plurality of feeding devices for respectively feeding successive increments of material into the receptacles, a plurality of means for respectively applying tamping pressure to each increment fed to each receptacle, operating means for the feeding devices and tamping means, driving means for the operating means, a plurality of means respectively actuated by the tamping means when the material in the corresponding receptacles reaches a predetermined level for disconnecting the operating means and corresponding feeding devices, a plurality of means respectively controlled by the tamping means, simultaneously with the actuation of the respective disconnecting means for the feeding devices, for locking the respective tamping means in inoperative position with respect to said operating means, and means controlled by said locking means for effecting disconnection of the operating and driving means when all the tamping means are in inoperative position, substantially as described.

28. In a receptacle filling machine, the combination of means for supporting a plurality of receptacles side by side in a vertical position, a plurality of feeding devices for respectively feeding successive increments of material into the receptacles, a plurality of gravity plungers for respectively applying tamping pressure to each increment fed to each receptacle, operating means for actuating the feeding devices and for elevating and releasing said plungers, a plurality of spring pressed locking members normally tending to lie in the path of said plungers and adapted respectively to lock said plungers in inoperative position with respect to said operating means, a plurality of latches respectively coöperating with said locking members to hold the same out of the path of the plungers, a plurality of means adapted respectively to effect the disconnection of the feeding devices and operating means, said plungers adapted respectively to actuate said latches to release said locking members and simultaneously to actuate the corresponding means for effecting disconnection of the corresponding feeding devices and operating means when the material in the corresponding receptacles reaches a predetermined level, substantially as described.

29. In a receptacle filling machine, the combination of means for supporting a plurality of receptacles side by side in a vertical position, a plurality of feeding devices for respectively feeding successive increments of material into the receptacles, a plurality of gravity plungers for respectively applying tamping pressure to each increment fed to each receptacle, operating means for actuating the feeding devices and for elevating and releasing said plungers, a plurality of spring pressed locking members normally tending to lie in the path of said plungers and adapted respectively to lock said plungers in inoperative position with respect to said operating means, a plurality of latches respectively coöperating with said locking members to hold the same out of the path of the plungers, a plurality of means adapted respectively to effect the connection and disconnection of the feeding devices and operating means, said plungers adapted respectively to actuate said latches to release said locking members and simultaneously to actuate the corresponding means to effect disconnection of the corresponding feeding devices and operating means when the material in the corresponding receptacles reaches a predetermined level, and resetting means for simultaneously actuating all the locking members to bring the same into operative engagement with said latches, releasing the plungers, and effecting the connection of the feeding devices with the operating means, substantially as described.

30. In a receptacle filling machine, the combination of a receptacle support, a feed hopper having an opening therein, means for intermittently and positively transferring successive increments of material from the hopper and feeding the same into the receptacle, and mechanism for arresting said means in a position closing said opening when the material reaches a predetermined level in said receptacle, substantially as described.

This specification signed and witnessed this 31st day of May, 1912.

THOS. A. EDISON.

Witnesses:
HENRY LANAHAN,
ANNA R. KLEHM.

Corrections in Letters Patent Nr. 1,178,063.

It is hereby certified that in Letters Patent No. 1,178,063, granted April 4, 1916, upon the application of Thomas A. Edison, of Llewellyn Park, West Orange, New Jersey, for an improvement in "Receptacle Filling Machines," errors appear in the printed specification requiring correction as follows: Page 5, lines 22-23, claim 1, and line 34, claim 2, for the words "tamping gravity" read *gravity tamping*; page 6, line 53, claim 14, before the word "replaceable" insert the word *rigid*; same page and claim, line 55, before the word "limit" insert the word *definitely*; and that the said Letters Patent should be read with these corrections therein that the same may conform to the record of the case in the Patent Office.

Signed and sealed this 28th day of November, A. D., 1916.

[SEAL.]

F. W. H. CLAY,
*Acting Commissioner of Patents.*

Cl. 100—57.